DELAY COMPENSATION CIRCUIT ARRANGEMENT

Filed April 3, 1964 5 Sheets-Sheet 1

INVENTORS
ROBERT A. DISCHERT &
BY NORMAN P. KELLAWAY
W. H. Sprouagle
Attorney

DELAY COMPENSATION CIRCUIT ARRANGEMENT

INVENTORS
ROBERT A. DISCHERT &
NORMAN P. KELLAWAY
BY W. H. Spouagle
Attorney

INVENTORS
ROBERT A. DISCHERT &
NORMAN P. KELLAWAY
BY
W. H. Sprouagle
Attorney

INVENTORS
ROBERT A. DISCHERT &
NORMAN P. KELLAWAY
W. H. Spouagle
Attorney

INVENTORS
ROBERT A. DISCHERT &
NORMAN P. KELLAWAY
BY
[signature]
Attorney

United States Patent Office 3,368,034
Patented Feb. 6, 1968

3,368,034
DELAY COMPENSATION CIRCUIT ARRANGEMENT

Robert A. Dischert, Burlington, and Norman P. Kellaway, Haddon Heights, N.J., assignors to Radio Corporation of America, a corporation of Delaware Filed Apr. 3, 1964, Ser. No. 357,028
4 Claims. (Cl. 178—69.5)

This invention relates to television broadcast apparatus. More particularly, the present invention relates to circuit arrangements which compensate for time delays of electrical signals occurring as the result of the transmission of the signals between different components of the apparatus.

Television broadcasting apparatus include one or more pick-up cameras located in the vicinity of a scene which is to be televised. As is well known, the camera produces video signals, representing image intelligence at the scene, for transmission to television receiving apparatus. For producing the video signals, the camera includes a light-sensitive electron discharge pick-up device such as an image orthicon, circuit means for periodically deflecting an electron beam across a target of the pick-up device, and preamplifying circuit means for amplifying a video signal which is generated by the deflected electron beam. In addition, circuit means are generally provided at the camera for establishing a white or black, beam blanking, reference level. Other characteristics of the video signal such as shading, gamma correction, and frequency compensation are provided by additional circuit means positioned in a video signal processing component which is generally located at a position remote to the camera. This processing component is located with other television equipment in a studio or it may be located in the field where it comprises a part of a mobile unit.

For proper apparatus performance, the operation of circuits at the camera is synchronized with circuits of the processing component. The operation of these components, referred to as a camera-chain, is in turn, synchronized with other camera-chains in the television broadcast apparatus. In providing the desired synchronization, a synchronizing signal is derived from a synchronizing signal generator and is coupled to the processor and thence to the camera over an interconnecting cable.

It is desirable to provide both mobility in the operation of the camera and, operation of the camera at points remote from the processor. The cable is thus relatively long and generally extends to lengths greater than 300 feet and at times up to 1500 feet. The cable comprises a distributed parameter transmission line for the frequencies utilized and the coupling of a synchronizing signal over such a transmission line introduces an undesirable time delay in the signal at the camera with respect to the same signal at the processor component. For similar reasons, the video signal which is generated at the camera and coupled to the processor component is delayed in time with respect to the same video signal at the camera component. The delayed operation is tolerable so long as synchronization of the apparatus is maintained. Fixed circuit arrangements have been provided for operating and maintaining synchronization with differing relatively short signal delays. Thus, interchangeable and differing relatively short lengths of cable have heretofore been utilized with the equipment. However, when utilizing differing lengths of relatively longer cable, the delays introduced by the cable become significant, synchronization is upset, and satisfactory operation is inhibited. Circuit means have therefore been provided in the equipment for compensating for the delays.

Prior circuit arrangements have compensated for the delay by further delaying the synchronizing signal for a period of time sufficient for causing synchronization at the processor between a synchronizing signal and the signals coupled from the camera to the processor. The period of this additional delay is generally the period of a horizontal beam deflection cycle $T_h$, minus twice the delay introduced by the length of cable $T_d$. The arrangement therefore compensates for delays encountered by signals coupled to and from the camera. Manually adjustable circuit means have been provided for effecting this compensating delay. However, these arrangements have disadvantageously necessitated the manual readjustment of the circuit means for each differing length of cable employed.

Accordingly, it is an object of this invention to provide a circuit arrangement which automatically compensates for cable delays of the type referred to when different lengths of relatively long cable are utilized with the camera.

In accordance with the present invention, a television broadcast apparatus includes a camera component for generating a video signal, a video signal processing component, means for applying a synchronizing signal to the processing component, a relatively long interconnecting cable for coupling signals including the synchronizing and video signals between the camera and processing components, and means for automatically compensating for differing delays encountered by the signals when corresponding differing lengths of cable are utilized. The compensating means comprises circuit means positioned at the camera for generating an adjustably delayed timing signal; phase comparator circuit means positioned at the processor for generating a control voltage having a characteristic thereof proportional to the phase relationship existing between input signals coupled to the processor; means coupling the timing and synchronizing signals to the phase comparator; and means coupling the control voltage to the timing signal generator at the camera in a manner for establishing a timing signal delay in accordance with the relationship existing between the synchronizing and timing signals. The timing signal is applied to circuits at the camera for controlling their periodicity of operation. Video signals coupled from the camera to the processor component are thereby synchronized in time at the processor with the synchronizing signal at the processor. By this arrangement, synchronization is automatically maintained when cables of differing relatively long lengths are utilized to intercouple the camera and the processor components.

These and other features of the invention will become apparent with reference to the following specifications and drawings in which.

Figures 1, 2:
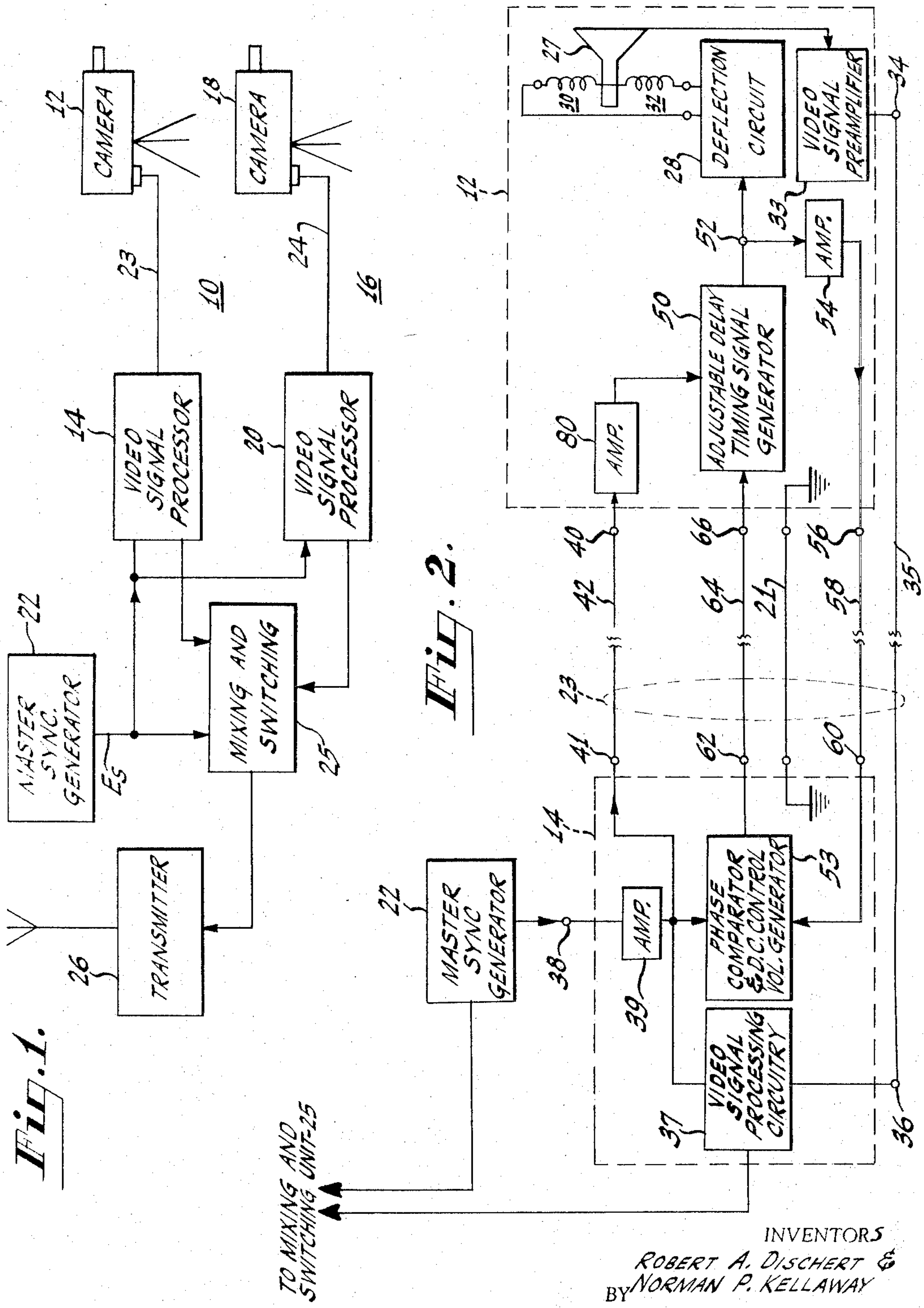
FIGURE 1 is a block diagram of a television broadcasting apparatus.
FIGURE 2 is a block diagram illustrating the processor and camera components of the television broadcasting apparatus of FIGURE 1 including an embodiment of the present invention.

Referring now to FIGURE 1, a television broadcast apparatus is shown to have a first camera-chain 10 including a camera component 12 and a video signal processor component 14, and a second camera-chain 16 including a camera component 18 and a video signal processor component 20. The camera components each generate a video signal which is coupled to the associated video signal processor. For synchronizing the operation of the apparatus and in particular the camera-chains, a synchronizing signal is provided by a generator 22 and is coupled to the video signal processors 14 and 20 and thence to the cameras 12 and 18 by cables 23 and 24 respectively. This signal indicated hereinafter as $E_s$, is a conventional EIA synchronizing signal, and includes horizontal and vertical synchronizing components as well as equalizing components. It will become apparent from the following discussion that other forms of a synchronizing signal may equally well be utilized with the present invention. The composite signal $E_s$, is coupled also to a mixing and switching unit 25 along with the video signals from the processors 14 and 20. In addition to providing various special effects, the unit 25 selects a particular video signal or combination of video signals for broadcast and superimposed the composite synchronizing signal $E_s$, upon the video signal to be broadcast. The selected video signal is then coupled to a transmitter 26 for transmission to receiving apparatus.

Figure 5:
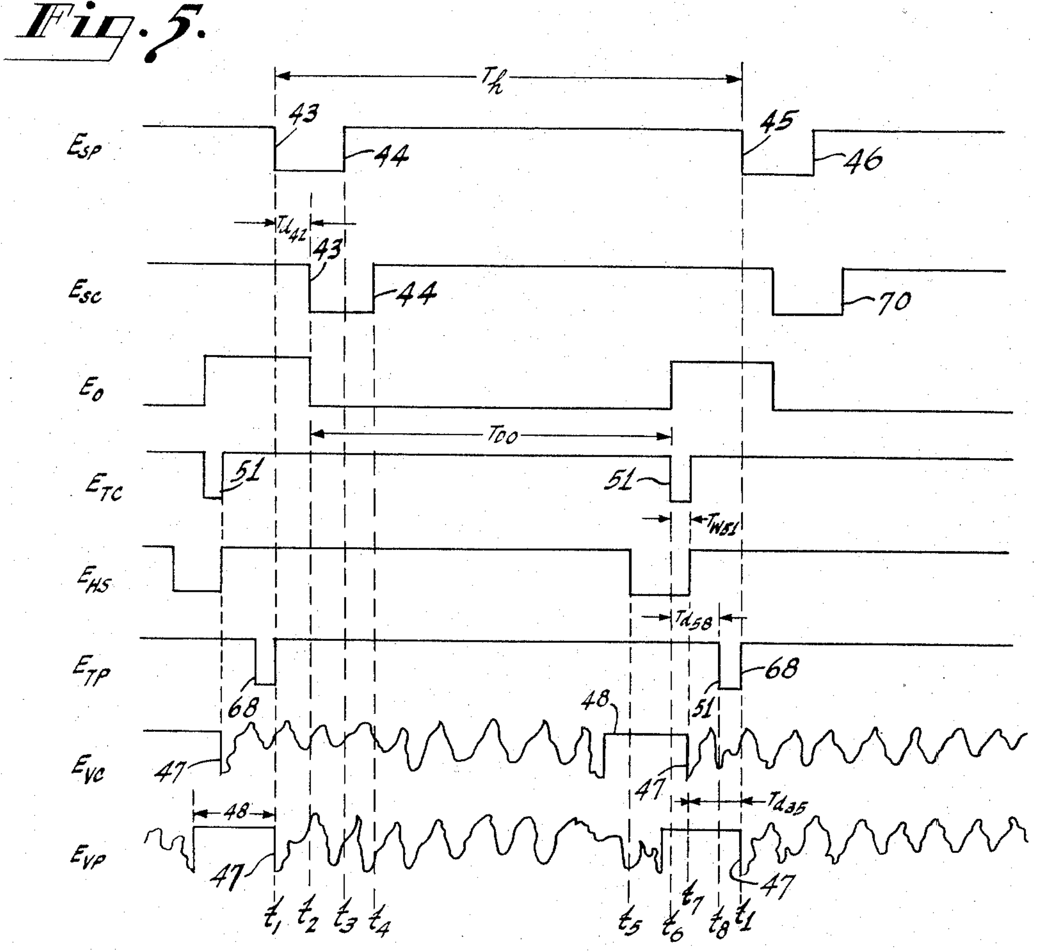
FIGURE 5 is a diagram illustrating the waveforms and relative timing of various signals occurring in the arrangements of FIGURES 2, 3, and 4.

The constituents of the camera component 12 and of the video signal processor 14 are illustrated in block form in FIGURE 2. The camera 12, which is indicated generally in FIGURE 2 by a rectangle formed by the dashed line, includes a light-sensitive pick-up device 27 which may comprise an image orthicon, a deflection circuit arrangement 28 for generating a deflection current in deflection coils 30 and 32 and periodically causing the deflection of an electron beam of the pick-up device 27 in a scanning raster across a target thereof, and a video signal preamplifier 33 for amplifying a video signal generated by the deflected electron beam. The cable 23, indicated generally by the dashed line, comprises a plurality of conductor pairs. The term conductor pair refers to a transmission line, such as a coaxial line, which is utilized with signals having relatively high frequency components. The video signal, at an output terminal 34, is coupled via a conductor pair 35 to an input terminal 36 of the processor 14. The video signal processor 14, indicated generally in FIGURE 2 by a rectangle formed by dashed line, includes a conventional video signal processing circuit arrangement 37 for adjusting various characteristics of the video signal such as shading and gamma and for providing frequency compensation. The synchronizing signal generator 22 provides a signal at the processor for synchronizing the operation of the video signal processing arrangement 37 with the apparatus. The synchronizing signal is coupled to a processor input terminal 38 and thence to the processing circuit 37 by an amplifier 39. An amplified synchronizing signal is also coupled from the amplifier 39 to an input terminal 40 of the camera 12 via a processor output terminal 41 and by a conductor pair 42 of cable 23. The synchronizing signal $E_s$ at the processor is indicated as $E_{sp}$ in order to distinguish it from the same synchronizing signal at the camera which is indicated hereinafter as $E_{sc}$. The signals $E_{sp}$ and $E_{sc}$ are illustrated in FIGURE 5. For simplifying the drawing of FIGURE 5, only horizontal synchronizing components of the composite synchronizing signal are illustrated.

The conductor pair 42 constitutes a distributed parameter transmission line for the frequencies involved. A time delay $T_{d42}$ (FIGURE 5), occurs in the transmission of the synchronizing signal between the terminals 41 and 40. As illustrated in FIGURE 5, a leading edge 43 of a synchronizing pulse component 44 occurs at a time $t_1$ at the processor while the same leading edge 43 occurs at a time $t_2$ at the camera. Similarly, a video signal $E_{vc}$ which is coupled from terminal 34 to terminal 36 by the conductor pair 35 experiences a delay $T_{d35}$ (FIGURE 5), in transmission.

The leading edge 43 of synchronizing signal pulse 44 initiates deflection at the camera and establishes a trailing edge 47 for a blanking interval 48 of the video signal $E_{vc}$. The blanking interval 48 as well as the periods of other signals in FIGURE 5 is exaggerated with respect to the period $T_e$ in order to clearly illustrate the waveforms and their relative timing. For proper synchronization, the leading edge 43 of the pulse 44 or an edge 45 of a succeeding synchronizing pulse 46 and the trailing edge 47 of the video signal blanking interval 48 should be coincident in time at the processor. However, because of the delay $T_{d42}$, initiation of deflection and consequent generation of the video signal $E_{vc}$ is retarded. Because of the delay $T_{d35}$, in video signal transmission, the video signal at the processor is further delayed. In the absence of a cable delay compensating arrangement such as is provided by the present invention the video signal at the processor is delayed with respect to $E_{sp}$ by an amount equal to the sum of the delays $T_{d42}$ and $T_{d35}$. When the cable 23 is relatively long, this sum is significant and synchronization of the apparatus is difficult to maintain. Circuit arrangements are therefore provided to assure synchronization and proper operation.

In providing for the interchangeable use of differing lengths of relatively long cable and for automatically compensating for the transmission delays encountered with these relatively long differing lengths, the circuit arrangement of FIGURE 2 includes circuit means 50 for generating a timing signal $E_{TC}$ (FIGURE 5), having a pulse component 51 whose occurrence is delayed in time with respect to the synchronizing signal $E_{sc}$, or viewed alternatively, is advanced with respect to a succeeding pulse 44. This timing signal, which is provided at a terminal 52, is coupled to circuits in the camera including the deflection circuit 28 for controlling the periodicity of their operation. Phase comparator means 53 are provided at the processor 14 for generating a control signal having a characteristic thereof which is proportional to the phase relationship existing between two input signals coupled thereto. A first of these input signals comprises the synchronizing signal $E_{sp}$ which is coupled from the amplifier 39 to the comparator 53. The second input signal comprises the timing signal which is coupled from the terminal 52 via an amplifier 54, an output terminal 56 of the camera 12, a conductive pair 58 of the cable 23, and an input terminal 60 to the phase comparator 53. The timing signal at the processor is indicated as $E_{tp}$ in FIGURE 5 in order to distinguish it from the same timing signal at the camera $E_{TC}$. The comparator 53 is adapted for generating a control voltage for providing and maintaining coincidence between $E_{tp}$ and $E_{sp}$. Deviations from this desired phase relationship are detected by the comparator 53 and a direct current, timing-signal, delay control voltage $E_{dc}$ (not illustrated), having an amplitude which is proportional to the phase deviation is generated. This voltage is coupled to the timing signal generator 50 via a processor output terminal 62, wires 64 and 21 and an input terminal 66 at the camera 12. The generator 50, is responsive to the voltage $E_{dc}$ and is adapted for automatically varying the amount of delay $T_{DO}$ in the occurrence of the pulse component 51 of the timing signal $E_{TC}$.

The manner in which the delays $T_{d42}$ and $T_{d35}$ are compensated for to permit the interchangeable use of differing lengths of relatively long cable will now be explained with reference to FIGURE 5. In general, the circuit arrangement provides for the advancement in the initiation of a deflection cycle at the camera with respect to the signals $E_{sp}$ by an amount of time equal to the delay $T_{d35}$. Thus, since deflection and viedo signal generation are advanced in time at the camera by an amount of time equal to the delay which is to be encountered in transmitting the video signal to the processor, the video signal coupled to the processor will occur in synchronization with a succeeding synchronizing pulse at the processor. More specifically, a leading edge 43 of the delayed signal $E_{sc}$ triggers and synchronizes an oscillator in the timing signal generator 50. The oscillator, which operates at the horizontal deflection frequency of 15,750 kc., may be a relaxation form of oscillator which provides an output signal $E_O$ (FIGURE 5), having a waveform including a step segment 72 occurring at time $t_6$ and which is delayed in time with respect to the edge 43 of pulse 44 by the period $T_{DO}$. A timing pulse 51 is initiated by the step segment 72. The generator 50 is adapted to increase or decrease the magnitude of $T_{DO}$ in response to the amplitude of a direct current control voltage $E_{dc1}$, which is coupled thereto and thus varies the occurrence of timing pulse 51. In its broader aspect, the present invention provides for the generation of a timing pulse 51 which precedes in time the leading edge 45 of the succeeding pulse component 46 of $E_{sp}$ by the period $T_{d35}$. That is, the period $T_{DO}$, is defined as:

$$T_{DO}=T_h-(T_{d42}+T_{d35})$$

However, for reasons indicated hereinafter, the period $T_{DO}$ of FIGURE 5 is shown to be:

$$T_{DO}=T_h-(T_{d42}+T_{d35}+T_{w51})$$

where $T_{w51}$ is the period of the pulse component 51. Pulse 51 is coupled to the deflection circuit 28 and causes deflection to be advanced by a period of time $T_{d35}$. A trailing edge 47 of the video signal blanking interval 48 is generated upon initiation of deflection. Since this edge is advanced in time an amount $T_{d35}$, it desirably occurs in coincidence with a leading edge 45 of a succeeding synchronizing pulse 46 at the processor and synchronization is therefore provided.

However, when the edges 45 of pulse 46 and the edge 47 of blanking level 48 are anticoincident such as when a different length of cable 23 is utilized, the comparator generates a control voltage which causes the generator to vary the period $T_{DO}$ a sufficient amount for reestablishing coincidence. The pulse 51 is coupled to the comparator 53 and anticoincidence between an edge 68 of $E_{TP}$ and an edge 45 of pulse 46 is detected. Since the transmission of pulse 51 subjects it to a delay $T_{d58}$, which is equal to $T_{d35}$, such an anticoincidence will only occur when video signal $E_{VP}$ and the synchronizing signal are not properly synchronized. The comparator generates a voltage which causes the generator 50 to vary the period $T_{DO}$ until coincidence between the edges 68 and 45 is reestablished. When coincidence is reestablished, the edges 45 and 47 are also coincident and the variation in delay is automatically compensated for. The desired coincidence will be reestablished after several deflection cycles have occurred. In order to avoid errors in synchronization which may occur when equalizing components of the composite synchronizing signal $E_s$, are coupled to the generator 50, the generator is adapted for responding only to alternate equalizing components.

Figure 3:
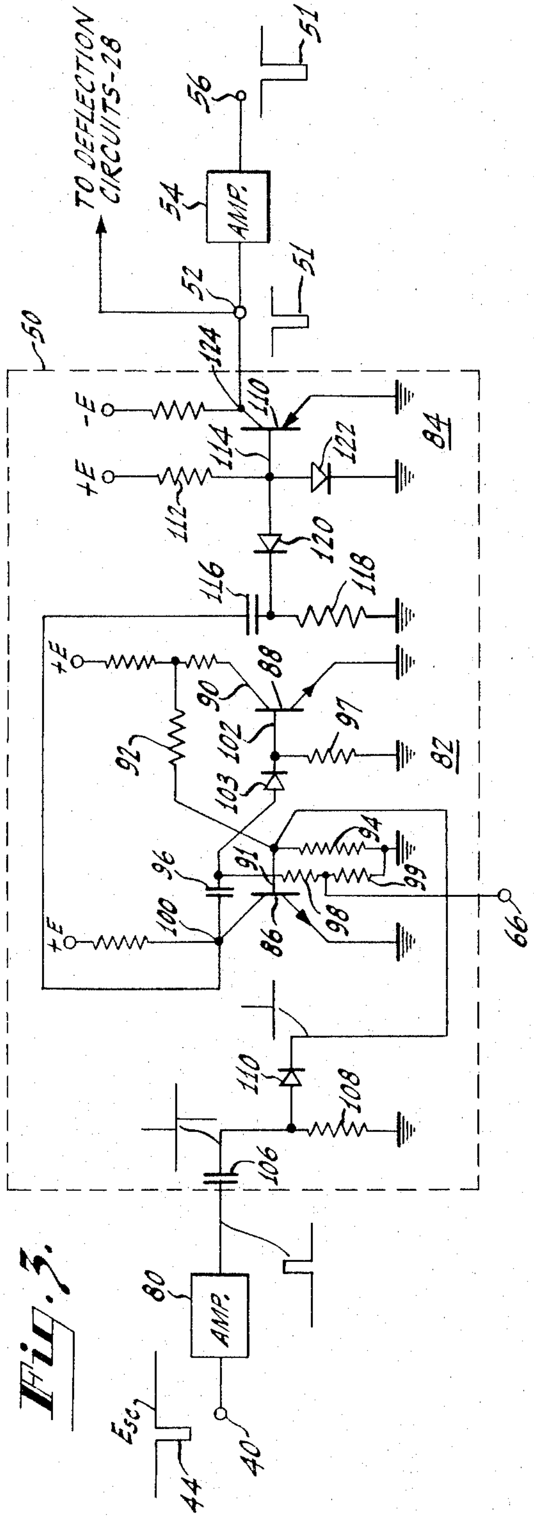
FIGURE 3 is a circuit diagram of an adjustable delay timing signal generator utilized in the camera component of FIGURE 2.

FIGURE 3 illustrates a particular circuit arrangement for the adjustable delay timing signal generator 50 of FIGURE 2. The generator 50, which is indicated generally by a rectangle formed by the dashed lines, includes a transistorized oscillator 82 and a pulse generator circuit arrangement 84. The oscillator 82 includes NPN transistors 86 and 88 arranged as a collector-coupled, astable, multivibrator. Feedback from a collector 90 of the transistor 88 to a base 91 of transistor 86 is provided by a resistive network comprising resistors 92 and 94. The relaxation time constant for the circuit arrangement is primarily established by a capacitor 96 and the parallel arrangement of a resistor 97 and resistors 98 and 99. The multivibrator operates in a conventional manner and a waveform $E_O$, FIGURE 5, occurring at a collector electrode 100 defines the delay period $T_{DO}$. A direct current voltage $E_{dc}$ is derived from the phase dectector 53 of FIGURE 2 and is coupled to the terminal 66 and to a base electrode 102 of the transistor 88 via the resistor 99 and diode 103. As indicated previously, this voltage is utilized to vary the period $T_{DO}$. This function is accomplished by varying the voltage to which the time constant circuit charges. The oscillator 82 is triggered by a synchronizing signal $E_{sc}$ which is coupled to the input terminal 40, amplified by an inverting type of amplifier 80, and coupled via a differentiating circuit including a capacitor 106 and a resistor 108, and a diode 110 to the base electrode 91 of the transistor 86. The differentiating circuit provides impulses occurring at the leading and trailing edges of pulse component signal $E_{sc}$. Diode 110 is polarized for coupling the impulse corresponding to the leading edge to the base electrode 91 for triggering the transistor 86 into collector current conduction thereby initiating the period $T_{DO}$.

The pulse generating circuit 84 includes a PNP transistor 110 arranged as a switching circuit which is driven between collector current saturation and cutoff. A resistor 112 couples a base electrode 114 to +E and biases the transistor in a normally conducting state. The voltage $E_O$ is coupled from the collector electrode 100 to the base electrode 114 by an RC network including a capacitor 116 and a resistor 118. At the initiation of the period $T_{DO}$, the transistor 110 is driven further into conduction and remains in this state until the occurrence of the step segment 72 of the signal $E_O$. This positive going segment drives the transistor 110 to collector current cutoff for a period of time determined by the time constant of the capacitor 116 and the resistor 118. This time constant is selected to provide a desired pulse with $T_{W51}$ as illustrated in FIGURE 5. For a well defined pulse 51, the period $T_{W51}$ is equal to or greater than the time required for the transistor 86 to switch from collector current saturation to collector current cutoff. The diodes 120 and 122 limit the alternate collector current excursions of the transistor 110. The pulse 51 which occurs at the collector electrode 124 of the transistor 110 is coupled to a terminal 52 and thence to circuits in the camera, and to a power amplifier 54, such as an emitter follower, which drives the conductor pair 58.

Figure 4:
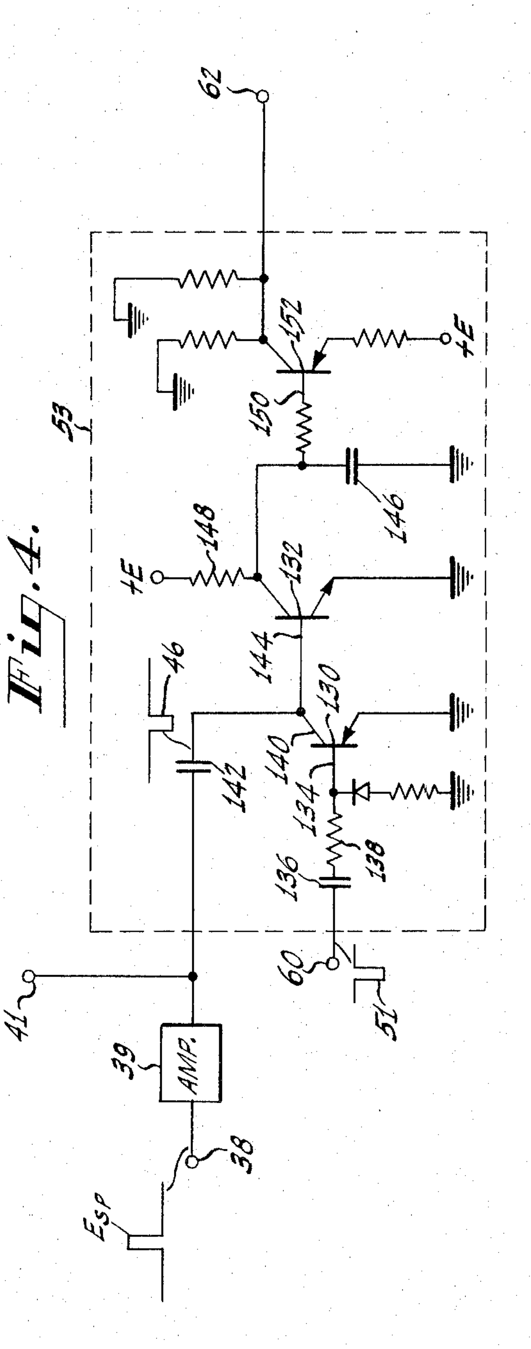
FIGURE 4 is a circuit diagram of a phase comparator utilized in the processor component of FIGURE 2.
Figure 6:
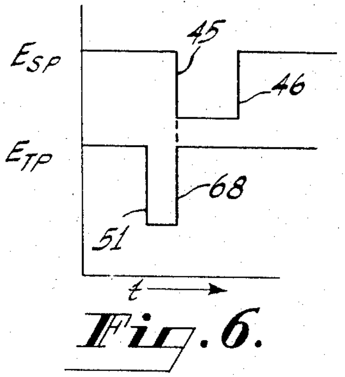
FIGURE 6 is a diagram illustrating a particular phase relationship existing between input signals to the phase comparator circuit of FIGURE 4.

A circuit diagram of the phase comparator 53 of FIGURE 2 is illustrated in FIGURE 4. The phase comparator in general is shown enclosed within the dashed lines. The comparator includes transistors 130 and 132 arranged to provide a direct current voltage whose amplitude is proportional to the phase relationships existing between the pulse component 51 of input timing signal $E_{TP}$ and an input synchronizing signal $E_{sp}$. The timing signal $E_{TP}$ is coupled to a base electrode 134 by an RC circuit including capacitor 136 and resistor 138. The synchronizing signal $E_{sp}$ which is coupled to an electrode 140 by a capacitor 142 supplies a collector voltage for the capacitor 130. The voltage at the collector 140 is directly coupled to a base electrode 144 of the transistor 132. The transistor 132 is arranged as a peak detector circuit having a charging capacitor 146. During a relatively short conduction period for the transistor 132, the capacitor 146 charges toward ground potential. During a relatively long nonconducting period for transistor 132, the capacitor 146 discharges relatively slowly through a collector resistor 148. The voltage to which the capacitor 146 charges during conduction is proportional to the phase relationship existing between the input timing pulse 51 and a pulse segment of the synchronizing signal $E_{sp}$. A desired phase relationship between these signals is indicated in FIGURE 6. When a trailing edge 68 of the pulse 51 is coincident in time with a leading edge 45 of the pulse 46, the transistor 132 will have an operating point between the extremes of saturation and collector current cutoff and a nominal DC voltage will be established across capacitor 146. This voltage will be substantially maintained by the capacitor 146 during the interval between successive synchronizing pulses. This voltage is coupled to a base electrode 150 of a DC amplifier 152. The amplified DC voltage constitutes a control voltage and, as indicated previously, is coupled to the oscillator 82 (FIGURE 3), for controlling the period $T_{DO}$. The period $T_{DO}$ is established at some nominal value when a relatively long cable 23 is provided for intercoupling the camera 12 and processor 14.

Figures 7, 8:
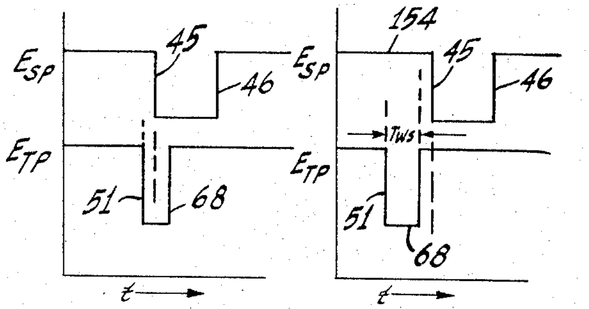
FIGURE 7 is a diagram illustrating another particular phase relationship existing between the input signals to the circuit of FIGURE 4.
FIGURE 8 is a diagram illustrating still another particular phase relationship existing between the input signals to the circuit of FIGURE 4.

When a relative longer cable is utilized, the delay times $T_{d35}$, $T_{d42}$, and $T_{d58}$ will increase and the trailing edge 68 of pulse 51 will be delayed in time with respect to the leading edge of pulse 46 at the processor. This situation is illustrated in FIGURE 7. The pulse 46 at the collector electrode 140 of transistor 130 will therefore be clamped substantially at ground potential for a short interval. The charge accumulated during this interval by the capacitor 146 is reduced to a value less than the charge accumulated during coincidence. The output voltage occurring at terminal 62 will therefore be less positive and the period $T_{DO}$ of the oscillator 82 will be decreased. After several cycles, the period $T_{DO}$ will be decreased until the edges 68 and 45 are once again coincident as in FIGURE 6.

Similarly, when a relatively shorter cable 23 is utilized, the edge 68 of pulse 51 will precede the edge 45 of pulse 46 as indicated in FIGURE 7, and collector 140 will be clamped at the base line level 154 of the synchronizing signal $E_{sp}$ during the occurrence of pulse 51. Accordingly, the capacitor will accumulate more charge than its normal value, the voltage at the terminal 62 will increase in amplitude in a positive direction, and the period $T_{DO}$ will be extended until coincidence is once again reestablished.

The deviations illustrated in FIGURES 7 and 8 from the value of coincidence illustrated in FIGURE 6 are exaggerated for purposes of illustration. In practice, the edge 68 will have a finite rise time and deviations in either direction from coincidence, measured from the center of the rise time, will not generally deviate more than half the period of the rise time. The circuit thus operates as a slope detector.

In FIGURE 2 the timing pulse is illustrated as being coupled to the phase comparator by a separate conductor pair 58. However, when the pulse with $T_{w51}$ is equal to or less than the blanking interval $T_{d35}$ of the video signal, the pulse 51 may be superimposed upon the video signal and coupled over the conductor pair 35 to the pulse 14. Such an arrangement advantageously reduces the number of conductor pairs required in the cable 23.

Figure 9:
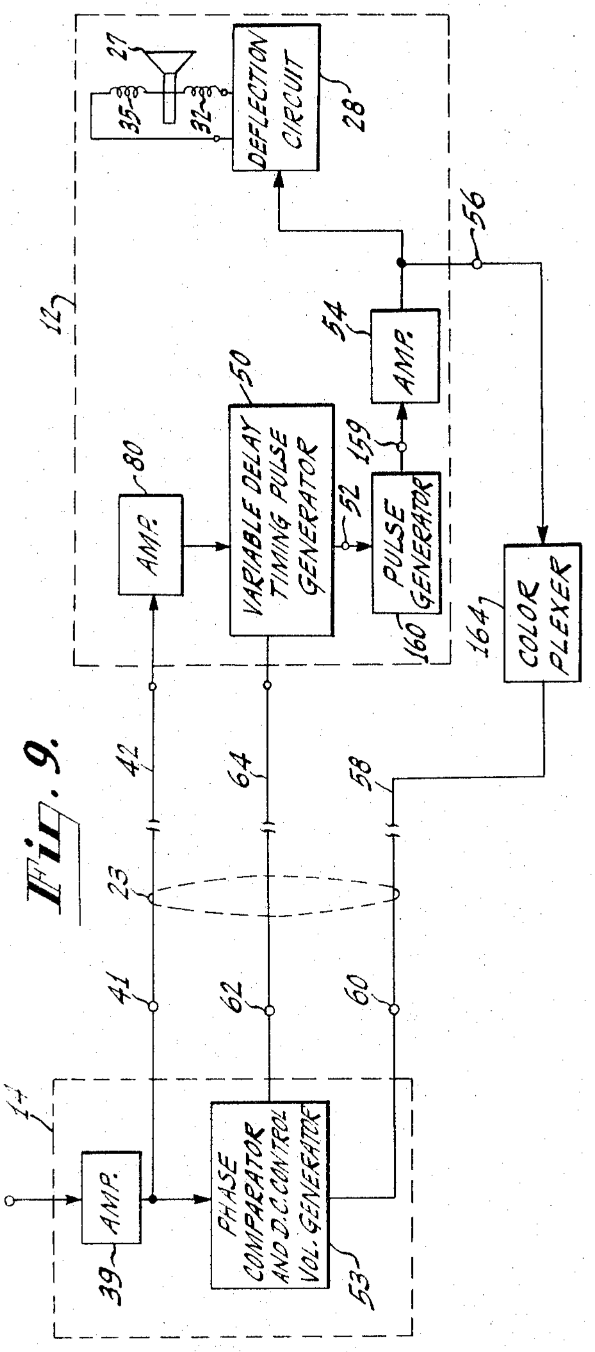
FIGURE 9 is a block diagram illustrating another embodiment of the present invention.
Figure 11:
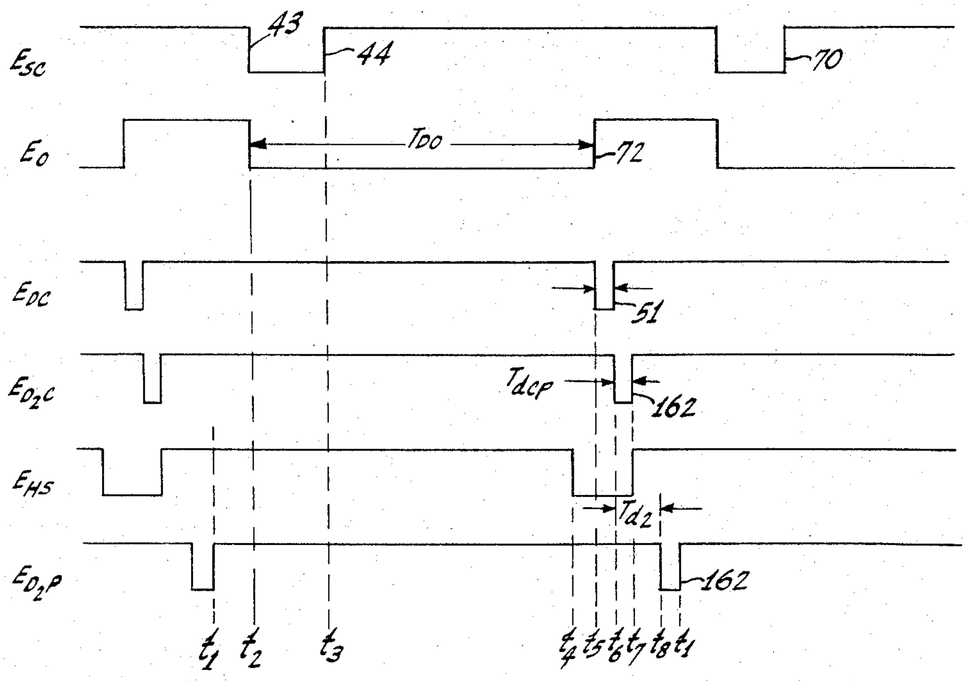
FIGURE 11 is a diagram illustrating the waveforms and relative timing of the various signals occurring in the arrangement of FIGURE 9.

In FIGURE 9, another embodiment of the present invention is illustrated. Components of FIGURE 9 which are similar to components in FIGURE 2 and which perform the same functions bear the same reference numerals. In certain television broadcast apparatus such as apparatus adapted for broadcasting color images, other circuits in addition to those at the camera 12 are required to be synchronized with the camera circuits. It is advantageous at times to couple the timing pulse 51 to these other circuits and thence to the processor 14. These additional circuits may introduce a delay in the transmission of the timing pulse to the processor in excess of that encountered on the conductor pair 58 alone. The transmission of the timing pulse 51 through these circuits generally provides a fixed delay which is independent of the cable length. In compensating for this additional fixed delay, a pulse generator 160 is provided for generating a pulse having a width substantially equal to the fixed delay provided by the additional circuits. In FIGURE 9 the timing pulse 51 occurring at terminal 52 is coupled to the pulse generator 160 for generating an additional pulse 162 (FIGURE 11). The pulse 162 is amplified by the amplifier 54 and is coupled to the additional circuits 164, indicated as a color-plexer equipment, and by a conductor pair 58 to the phase comparator 53. The colorplexer 164 introduces a fixed delay $T_{dcp}$ (FIGURE 11), and the generator 160 is adapted to generate a pulse 162 having this pulse width. The pulse 162 in turn is coupled to the comparator 53 for phase comparison with the synchronizing signal. Anticoincidence is detected and synchronization is reestablished as indicated hereinbefore.

Figure 10:
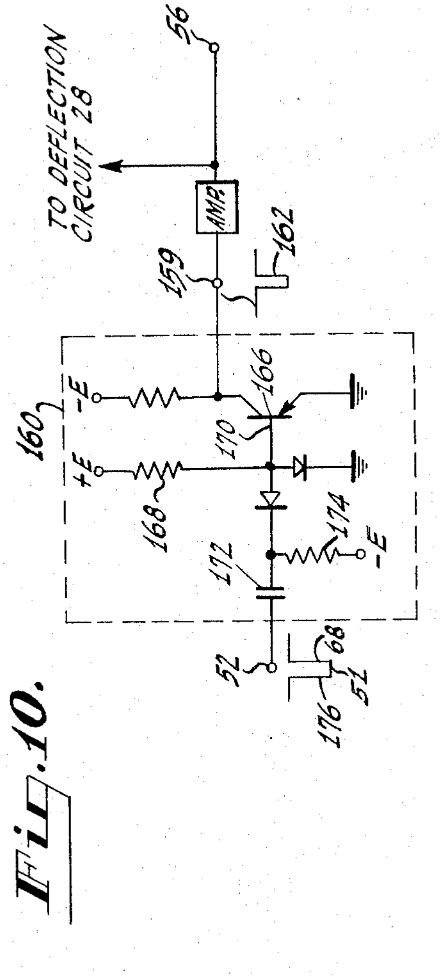
FIGURE 10 is a circuit diagram illustrating a circuit arrangement for use with the embodiment of the invention illustrated in FIGURE 9.

In FIGURE 10 a circuit arrangement for the pulse generator 160 is illustrated. The pulse generator 160, indicated generally within the dashed lines, includes a PNP transistor 166 arranged in a switching circuit which is driven between collector current saturation and cutoff. A resistor 168 couples a base electrode 170 to +E and biases the transistor in a normally conducting state. The pulse 51 is coupled from the collector electrode 124 of transistor 110 (FIGURE 3) to the base electrode 170 by an RC circuit including a capacitor 172 and a resistor 174. A leading edge 176 of the pulse 51 (FIGURE 10), momentarily drives the transistor further into saturation and the transistor remains saturated until the occurrence of a trailing edge 68 drives the transistor to collector current cutoff for a period of time determined by the time constant of the capacitor 172 and the resistor 174. The time constant is selected to provide a pulse width $T_{dcp}$ which is substantially equal to a fixed delay of the nature hereinbefore indicated and which is encountered during transmission of the pulse to the processor. The pulse generator 160 therefore operates in the same manner as the pulse generator 84 of FIGURE 3, and further elaboration is believed unnecessary. The various waveforms occurring in the arrangement of FIGURE 9 are illustrated in FIGURE 11.

Thus an arrangement has been described which advantageously, automatically maintains synchronization when cables of differing relatively long lengths are utilized to intercouple the camera and processor components. In addition, an arrangement has also been described which provides for a constant delay encountered by signals utilized in the cable delay compensating arrangement.

While there is illustrated, described and pointed out in the annexed claims certain novel features of the invention, it will be understood that various omissions, substitutions, and changes in the forms and details of the system illustrated may be made by those skilled in the art without departing from the spirit of the invention and the scope of the claims.

What is claimed is:

1. A circuit arrangement for compensating for signal delays in a television broadcast apparatus, comprising:
   - a camera component for generating a video signal,
   - said camera component including circuit means for generating a timing signal which is delayed in time with respect to a synchronizing signal applied thereto;
   - said circuit means adapted for automatically varying the timing signal delay in a response to a control signal applied thereto;
   - a video signal processor component,
   - said processor component including phase comparator circuit means for providing a control signal having a characteristic thereof which is proportional to the phase relationship betweeen two input signals applied thereto;
   - means for providing and applying a synchronizing signal of said phase comparator circuit means;
   - means for coupling said synchronizing and control signals from said processor component to said camera component and for applying said synchronizing and control signals to said timing signal generating means; and means for coupling said timing signal and a video signal from said camera to said processor component and for applying said timing signal to said phase comparator circuit means.

2. A circuit arrangement for compensating for signal delays in a television broadcast apparatus, comprising:

a camera component for generating a video signal, said camera component having circuit means including an oscillator circuit arrangement for generating a timing signal which is delay in time with respect to a synchronizing signal applied to the oscillator, said circuit means adapted for automatically varying the timing signal delay in response to a control signal which is applied to the oscillator;

a video signal processor component, said processor component including a phase comparator circuit arrangement adapted for providing an output control signal having a characteristic which is proportional to the phase relationships between two input signals applied to the comparator;

means for providing a synchronizing signal and for applying said synchronizing signal to said comparator for phase comparison with said timing signal; and means, including a cable intercoupling said camera and processor components, for coupling said timing and video signals from said camera to said processor component and for applying said timing signal to said phase comparator circuit arrangement and for coupling said synchronizing and control signals from said processor component to said timing signal oscillator.

3. A circuit arrangement for compensating for signal delays in a television broadcast apparatus, comprising:

a camera component for generating a video signal, said camera component having circuit means including a relaxation oscillator circuit arrangement for generating a timing signal which is delayed in time with respect to a synchronizing signal applied to the oscillator, said oscillator adapted for automatically varying the timing signal delays in response to a direct current control signal which is applied to said oscillator;

a video signal processor component, said processor component including a phase comparator circuit arrangement adapted for providing a direct current output control signal having an amplitude which is proportional to the phase relationship existing between two input signals applied to the comparator;

means for providing and applying a synchronizing signal to said phase comparator for phase comparison with said timing signal; and means, including a relatively long cable intercoupling said camera and processor components, for coupling said timing and video signals from said camera to said processor component and for applying said timing signal to said phase component and arrangement and for coupling said synchronizing signal and control signals from said processor component to said timing signal oscillator in a manner for synchronizing the operation of said oscillator and for controlling the delay of said timing signal.

4. A circuit arrangement for compensating for signal delays in a television broadcast apparatus, comprising:

a camera component for generating and providing a video signal at a camera output terminal;

said camera component including an image pick-up electron discharge device and a deflection circuit arrangement for deflecting an electron beam across a target of the device in synchronization with a camera timing signal coupled thereto, a multivibrator and a pulse generator arranged for generating a camera timing signal which is delayed in time with respect to a synchronizing signal applied to said multivibrator, said multivibrator adapted for automatically varying the delay of said timing signal in accordance with a direct current control signal which is applied thereto and to an input terminal of said camera;

means coupling said camera timing signal to said deflection circuit and to an output terminal of said camera;

means for providing a synchronizing signal at an output terminal of said processor and for applying said synchronizing signal to said phase comparator amplifier for phase comparison with said timing signal;

a video signal processor component, said processor component including an amplifier and peak signal detector arranged for providing a direct current output voltage having an amplitude which is proportional to the phase relationship between two input signals coupled to said amplifier;

a relatively long cable for intercoupling said camera and processor components, said cable including means for coupling said video signal for said camera output terminal to said processor component, means for coupling said timing signal from said camera output terminal to said phase detector amplifier, and means for coupling said synchronizing and control signals from said referenced processor terminals to said multivibrator.

References Cited

UNITED STATES PATENTS 3,165,585 1/1965 James ............. 178—69.5

JOHN W. CALDWELL, *Primary Examiner.*

R. L. RICHARDSON, *Assistant Examiner.*